United States Patent
Dutt et al.

(10) Patent No.: US 7,876,711 B2
(45) Date of Patent: *Jan. 25, 2011

(54) FIBRE CHANNEL SWITCH THAT ENABLES END DEVICES IN DIFFERENT FABRICS TO COMMUNICATE WITH ONE ANOTHER WHILE RETAINING THEIR UNIQUE FIBRE CHANNEL DOMAIN_IDS

(75) Inventors: Dinesh G. Dutt, San Jose, CA (US); Thomas Edsall, Cupertino, CA (US); Ankur Jain, San Jose, CA (US); Silvano Gai, San Jose, CA (US); Subrata Banerjee, Los Altos, CA (US); Davide Bergamasco, Sunnyvale, CA (US); Bruno Raimondo, Mountain View, CA (US); Rajeev Bharadwaj, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 32 days.

This patent is subject to a terminal disclaimer.

(21) Appl. No.: 12/343,843

(22) Filed: Dec. 24, 2008

(65) Prior Publication Data

US 2009/0141657 A1 Jun. 4, 2009

Related U.S. Application Data

(63) Continuation of application No. 10/609,442, filed on Jun. 26, 2003, now Pat. No. 7,499,410.

(51) Int. Cl.
*H04L 12/28* (2006.01)
*H04L 12/56* (2006.01)
(52) U.S. Cl. .................. 370/254; 370/392; 370/401; 709/242
(58) Field of Classification Search .................. None
See application file for complete search history.

(56) References Cited

U.S. PATENT DOCUMENTS 5,428,471 A 6/1995 McDermott (Continued)

FOREIGN PATENT DOCUMENTS

EP 0772121 A 5/1997

(Continued)

OTHER PUBLICATIONS

White Paper, Link Aggregation According to IEEE Standard 802.3ad, Oct. 10, 2002, v. 1.10, pp. 1-21.

(Continued)

*Primary Examiner*—Pankaj Kumar
*Assistant Examiner*—Robert C Scheibel
(74) *Attorney, Agent, or Firm*—Weaver Austin Villeneuve and Sampson LLP

(57) ABSTRACT

A Fibre Channel Switch which enables end devices in different Fabrics to communicate with one another while retaining their unique Fibre Channel Domain_IDs. The Switch is coupled to a first fabric having a first set of end devices and a second fabric having a second set of end devices. The Switch is configured to enable communication by the first set of end devices associated with the first fabric with the second set of end devices associated with the second set of end devices using the unique Domain_IDs of each of the first set and the second set of end devices. In one embodiment of the invention, the first and second fabrics are first and second Virtual Storage Array Networks (VSANs) respectively. In an alternative embodiment, the first fabric and the second fabric are separate physical fabrics.

20 Claims, 7 Drawing Sheets

U.S. PATENT DOCUMENTS

| | | | |
|---|---|---|---|
| 5,506,838 A | 4/1996 | Flanagan |
| 5,617,421 A | 4/1997 | Chin et al. |
| 5,619,497 A | 4/1997 | Gallagher et al. |
| 5,675,741 A | 10/1997 | Aggarwal et al. |
| 5,682,479 A | 10/1997 | Newhall et al. |
| 5,708,659 A | 1/1998 | Rostoker et al. |
| 5,740,159 A | 4/1998 | Ahmad et al. |
| 5,740,171 A | 4/1998 | Mazzola et al. |
| 5,742,604 A | 4/1998 | Edsall et al. |
| 5,764,636 A | 6/1998 | Edsall |
| 5,793,976 A | 8/1998 | Chen et al. |
| 5,809,285 A | 9/1998 | Hilland |
| 5,818,603 A | 10/1998 | Motoyama |
| 5,819,112 A | 10/1998 | Kusters |
| 5,862,125 A | 1/1999 | Russ |
| 5,959,972 A | 9/1999 | Hamami |
| 5,959,990 A | 9/1999 | Frantz et al. |
| 5,964,841 A | 10/1999 | Rekhter |
| 5,999,930 A | 12/1999 | Wolff |
| 6,035,105 A | 3/2000 | McCloghrie et al. |
| 6,046,985 A | 4/2000 | Aldred |
| 6,101,497 A | 8/2000 | Ofek |
| 6,160,813 A | 12/2000 | Banks et al. |
| 6,188,668 B1 | 2/2001 | Brewer et al. |
| 6,188,694 B1 | 2/2001 | Fine et al. |
| 6,202,135 B1 | 3/2001 | Kedem et al. |
| 6,205,488 B1 | 3/2001 | Casey et al. |
| 6,208,623 B1 | 3/2001 | Rochberger et al. |
| 6,208,649 B1 | 3/2001 | Kloth |
| 6,209,059 B1 | 3/2001 | Ofer et al. |
| 6,219,699 B1 * | 4/2001 | McCloghrie et al. ........ 709/221 |
| 6,226,771 B1 | 5/2001 | Hilla et al. |
| 6,243,358 B1 | 6/2001 | Monin |
| 6,260,120 B1 | 7/2001 | Blumenau et al. |
| 6,262,977 B1 | 7/2001 | Seaman et al. |
| 6,266,705 B1 | 7/2001 | Ullum et al. |
| 6,269,381 B1 | 7/2001 | St. Pierre et al. |
| 6,269,431 B1 | 7/2001 | Dunham |
| 6,295,296 B1 | 9/2001 | Tappan |
| 6,295,575 B1 | 9/2001 | Blumenau et al. |
| 6,310,884 B1 | 10/2001 | Odenwald, Jr. |
| 6,330,614 B1 | 12/2001 | Aggarwal et al. |
| 6,337,861 B1 | 1/2002 | Rosen |
| 6,388,995 B1 | 5/2002 | Gai et al. |
| 6,408,001 B1 | 6/2002 | Chuah et al. |
| 6,426,952 B1 | 7/2002 | Francis et al. |
| 6,438,612 B1 | 8/2002 | Ylonen et al. |
| 6,473,421 B1 * | 10/2002 | Tappan ....................... 370/351 |
| 6,493,349 B1 | 12/2002 | Casey |
| 6,529,693 B2 | 3/2003 | Fredin et al. |
| 6,532,212 B1 | 3/2003 | Soloway et al. |
| 6,597,663 B1 | 7/2003 | Rekhter |
| 6,604,407 B2 | 8/2003 | Kano |
| 6,643,287 B1 | 11/2003 | Callon et al. |
| 6,661,773 B1 | 12/2003 | Pelissier et al. |
| 6,674,760 B1 | 1/2004 | Walrand et al. |
| 6,728,220 B2 | 4/2004 | Behzadi |
| 6,728,848 B2 | 4/2004 | Tamura et al. |
| 6,766,482 B1 | 7/2004 | Yip et al. |
| 6,775,230 B1 | 8/2004 | Watanabe et al. |
| 6,804,776 B1 | 10/2004 | Lothberg et al. |
| 6,848,007 B1 | 1/2005 | Reynolds et al. |
| 6,859,435 B1 | 2/2005 | Lee et al. |
| 6,879,560 B1 | 4/2005 | Cahn |
| 6,904,053 B1 | 6/2005 | Berman |
| 6,915,358 B2 | 7/2005 | Horton et al. |
| 6,920,133 B1 | 7/2005 | Boodaghians |
| 6,920,153 B2 | 7/2005 | Ellis et al. |
| 6,920,154 B1 | 7/2005 | Achler |
| 6,947,379 B1 | 9/2005 | Gleichauf et al. |
| 6,959,151 B1 | 10/2005 | Cotter et al. |
| 6,975,589 B2 | 12/2005 | Luft et al. |
| 6,985,490 B2 * | 1/2006 | Czeiger et al. .............. 370/401 |
| 7,006,525 B1 | 2/2006 | Jha |
| 7,026,288 B2 | 4/2006 | Judice et al. |
| 7,027,406 B1 | 4/2006 | Shabtay et al. |
| 7,046,679 B2 | 5/2006 | Sampath et al. |
| 7,050,392 B2 | 5/2006 | Valdevit |
| 7,054,304 B2 | 5/2006 | Wang |
| 7,061,858 B1 | 6/2006 | Di Benedetto et al. |
| 7,072,298 B2 | 7/2006 | Paul et al. |
| 7,076,594 B2 | 7/2006 | Benedetto et al. |
| 7,079,544 B2 | 7/2006 | Wakayama et al. |
| 7,082,140 B1 | 7/2006 | Hass et al. |
| 7,085,846 B2 | 8/2006 | Jenne et al. |
| 7,155,494 B2 | 12/2006 | Czeiger et al. |
| 7,161,935 B2 * | 1/2007 | Alonso et al. ............... 370/384 |
| 7,206,288 B2 | 4/2007 | Cometto et al. |
| 7,216,158 B2 | 5/2007 | Revanuru et al. |
| 7,221,652 B1 | 5/2007 | Singh et al. |
| 7,275,103 B1 | 9/2007 | Thrasher et al. |
| 7,301,898 B1 | 11/2007 | Martin |
| 7,302,494 B2 | 11/2007 | Hayashi et al. |
| 7,319,669 B1 | 1/2008 | Kunz et al. |
| 7,328,260 B1 | 2/2008 | Muthiyan et al. |
| 7,330,892 B2 | 2/2008 | Ibrahim |
| 7,355,983 B2 | 4/2008 | Scudder et al. |
| 7,366,194 B2 | 4/2008 | Yu et al. |
| 7,376,755 B2 | 5/2008 | Pandya |
| 7,406,034 B1 | 7/2008 | Cometto et al. |
| 7,433,326 B2 | 10/2008 | Desai et al. |
| 7,443,799 B2 | 10/2008 | Varanasi et al. |
| 7,447,224 B2 | 11/2008 | Dropp et al. |
| 7,499,410 B2 | 3/2009 | Dutt et al. |
| 7,593,324 B2 | 9/2009 | Jain et al. |
| 7,599,360 B2 | 10/2009 | Edsall et al. |
| 7,616,637 B1 | 11/2009 | Lee et al. |
| 7,649,844 B2 | 1/2010 | Bector et al. |
| 2001/0020254 A1 | 9/2001 | Blumenau et al. |
| 2001/0049739 A1 | 12/2001 | Wakayama et al. |
| 2002/0009081 A1 | 1/2002 | Sampath et al. |
| 2002/0034178 A1 | 3/2002 | Schmidt et al. |
| 2002/0075873 A1 | 6/2002 | Lindhorst-Ko et al. |
| 2002/0085493 A1 | 7/2002 | Pekkala et al. |
| 2002/0101868 A1 | 8/2002 | Clear et al. |
| 2002/0110125 A1 | 8/2002 | Banks et al. |
| 2002/0133740 A1 | 9/2002 | Oldfield et al. |
| 2002/0150039 A1 | 10/2002 | Valdevit et al. |
| 2002/0152338 A1 | 10/2002 | Elliott et al. |
| 2002/0156918 A1 | 10/2002 | Valdevit et al. |
| 2002/0156924 A1 | 10/2002 | Czeiger et al. |
| 2002/0176434 A1 | 11/2002 | Yu et al. |
| 2002/0188754 A1 | 12/2002 | Foster et al. |
| 2003/0012204 A1 | 1/2003 | Czeiger et al. |
| 2003/0016624 A1 | 1/2003 | Bare |
| 2003/0067925 A1 | 4/2003 | Choe et al. |
| 2003/0101239 A1 | 5/2003 | Ishizaki |
| 2003/0107987 A1 | 6/2003 | Kinstler |
| 2003/0118053 A1 | 6/2003 | Edsall et al. |
| 2003/0145116 A1 | 7/2003 | Moroney et al. |
| 2003/0149848 A1 | 8/2003 | Ibrahim et al. |
| 2003/0163727 A1 | 8/2003 | Hammons et al. |
| 2003/0189929 A1 | 10/2003 | Matsuzaki et al. |
| 2003/0198247 A1 | 10/2003 | Gardner et al. |
| 2004/0028060 A1 | 2/2004 | Kang |
| 2004/0100910 A1 | 5/2004 | Desai et al. |
| 2004/0151174 A1 | 8/2004 | Del Signore et al. |
| 2004/0151188 A1 | 8/2004 | Maveli et al. |
| 2004/0230787 A1 | 11/2004 | Blumenau et al. |
| 2004/0233921 A1 * | 11/2004 | Krieg et al. ................. 370/406 |
| 2005/0018606 A1 | 1/2005 | Dropps et al. |
| 2005/0018663 A1 | 1/2005 | Dropps et al. |
| 2005/0018701 A1 | 1/2005 | Dropps |
| 2005/0036499 A1 | 2/2005 | Dutt et al. |

| | | | |
|---|---|---|---|
| 2005/0080903 | A1 | 4/2005 | Moshe |
| 2005/0088969 | A1 | 4/2005 | Carlsen et al. |
| 2005/0108444 | A1 | 5/2005 | Flauaus |
| 2005/0117562 | A1 | 6/2005 | Wrenn |
| 2005/0177634 | A1 | 8/2005 | Scudder et al. |
| 2005/0249123 | A1 | 11/2005 | Finn |
| 2005/0267965 | A1 | 12/2005 | Heller |
| 2006/0034302 | A1 | 2/2006 | Peterson |
| 2006/0038263 | A1 | 2/2006 | Eigner et al. |
| 2006/0087963 | A1 | 4/2006 | Jain et al. |
| 2006/0092932 | A1 | 5/2006 | Ghosh et al. |
| 2006/0117212 | A1 | 6/2006 | Meyer et al. |
| 2006/0153186 | A1 | 7/2006 | Bector |
| 2006/0159081 | A1 | 7/2006 | Dropps |
| 2007/0153816 | A1 | 7/2007 | Cometto et al. |
| 2008/0028096 | A1 | 1/2008 | Henderson et al. |
| 2008/0316942 | A1 | 12/2008 | Desai et al. |
| 2010/0008375 | A1 | 1/2010 | Campbell et al. |

FOREIGN PATENT DOCUMENTS

| | | |
|---|---|---|
| EP | 0858036 | 8/1998 |
| EP | 1134938 | 9/2001 |
| EP | 1187406 | 3/2002 |
| JP | 2-20944 | 8/1990 |
| JP | 08111693 | 4/1996 |
| JP | 10-293633 | 11/1998 |
| JP | 2000-22699 | 2/2000 |
| JP | 2001-154929 | 6/2001 |
| JP | 2001-320420 | 11/2001 |
| JP | 2001-345865 | 12/2001 |
| KR | 2001-008321 | 1/2001 |
| WO | WO 00/31925 | 6/2000 |
| WO | WO 01/19027 | 3/2001 |
| WO | WO01/69834 | 9/2001 |
| WO | WO 01/95565 | 12/2001 |
| WO | WO02/71224 | 12/2002 |

OTHER PUBLICATIONS

Notice of Allowance dated May 29, 2009 from U.S. Appl. No. 10/034,160.
Allowed Claims for U.S. Appl. No. 10/034,160, May 29, 2009.
Second Office Action issued on Apr. 28, 2009 for Canadian Patent Application No. 2,472,056.
EP Office Action dated May 30, 2006 from related EP Application No. 02799279.1-1525.
Notification of Provisional Rejection issued on Apr. 15, 2009 for KR Patent Application No. 2004-7010143.
Canadian Office Action issued on Jan. 30, 2008 for Patent Application No. 2,480,461.
Chinese Office Action issued on Dec. 26, 2008 for Patent Application No. 03807560.1.
Japanese Office Action dated Dec. 22, 2008 from related JP Application No. 2003-582973.
Japanese Office Action issued on May 25, 2009 for Patent Application No. 2003-582964.
Canadian Office Action issued on Aug. 13, 2008 for Patent Application No. 2,480,462.
Chinese Office Action, Chinese Patent Application No. 03807600.4, Issued May 8, 2009.
Office Action mailed for U.S. Appl. No. 10/114,394, Mar. 23, 2009.
Notice of Allowance dated Jun. 25, 2009 from U.S. Appl. No. 10/114,394.
Allowed Claims for U.S. Appl. No. 10/114,394, Jun. 25, 2009.
U.S. Appl. No. 11/713,341, filed Mar. 2, 2007.
Second Office Action issued on Apr. 24, 2009 for Chinese Patent Application No. 200380104466.6.
U.S Office Action mailed Aug. 18, 2009 in U.S. Appl. No. 12/202,004.
USPTO Notice of Allowance for U.S. Application No. 10/609,442, mailed Sep. 26, 2008.
Office Action for AU Patent Application No. 20043000680, dated Sep. 26, 2008.
Office Action for CA Patent U.S. Appl. No. 2,521,463 dated Sep. 24, 2008.
Canadian Office Action mailed Jun. 17, 2009 in Application No. 2,472,056.
Chinese Office Action for Patent Application No. 200480010826.0, dated Nov. 7, 2008.
U.S. Appl. No. 10/974,368, Notice of Allowance dated Apr. 21, 2009.
Allowed Claims for U.S. Appl. No. 10/974,368, Apr. 21, 2009.
U.S. Office Action dated Jul. 10, 2009 from U.S. Appl. No. 10/979,886.
Notice of Allowance dated Jun. 26, 2009 from U.S. Appl. No. 11/027,252.
Allowed Claims for U.S. Appl. No. 11/027,252, Jun. 26, 2009.
ATM Forum Committee, Chapter 10, Flush Message Protcol Procedures and Frame Formats,: Lan Emulation Over ATM Version 2—LUNI Specification, Af-Lane-0084.000, Jul. 1997, pp. 111-115.
CISCO Systems, Inc. (1992-2003), "Cisco MDS 9000 Family of Multilayer Directors and Fabric Switches," pp. 1-4.
CISCO Systems, Inc. (1992-2003), "Cisco SAN-OS," pp. 1-7.
CISCO Systems, Inc. (1992-2004), "Cisco SAN-OS Reference Guide," pp. 1-13.
Cometto et al. (Apr. 1, 2002), "Methods and Apparatus for Fibre Channel Frame Delivery," U.S. Appl. No. 10/114,568.
Cometto et al., Allowed Claims for U.S. Appl. No. 10/170,855, 2006.
Cometto et al., Notice of Allowance for U.S. Appl. No. 10/170,855.
Desanti, "Extended_Headers," VF N_Port Model T11/04-627v1, 1 page, Oct. 2004.
Desanti, "Virtual Fabrics N_Port Support," VF N_Support, T11/04-494v2, 14 pages, Oct. 2004.
Desanti (Oct. 2004), "Virtual Fabrics Switch Support", VF Switch Support, T11/04-395v3, 15 pages.
Desanti (Apr. 2003), "Virtual Fabrics," T11/03-220v0, 11 pages (Microsoft PowerPoint presentation).
Desanti (Jul. 2004), "Virtual Fabrics N_Port Support," VF N_Support, T11/04-49v0, 13 pages.
Desanti et al. (May 2003), "Tagged Frame Specification," Tagged Frame Spec., T11/03-353v0, 4 pages.
D1: Yasumori Takizawa, "Technology Scope IP Storage Disk Divided by IP Network Wide Area Ethernet Encouraging the Same," Nikkei Communication, Mar. 4, 2000, No. 361, pp. 106-113.
D2: Glenn Sulllivan, "Building of Long Distance SAN," UNIX Magazine, Apr. 1, 2000, vol. a6, No. 4, pp. 133-137.
D4: Fujita, et al., "SSE98-225 QoS Control Using MPLS over ATM," Technical Report of IEICE, Mar. 19, 1999, vol. 98, No. 668, pp. 81-86.
Guan et al. (May 30, 2003), "Inter-fabric FC Architecture," Brocade—The Intelligent Platform for Network Storage.
IEEE Std 802.3-2002, Chapter 43.5 Marker Protcol, Part 3: Carrier Sense Multiple Access with Collision Detection (CSMA/CD) Detection (CSMA/CD Access Method and Physical Layer Specifications, 2002, pp. 329-345.
Kiiskila, "Implementation of LAN Emulation of ATM in Linux," Tampereen Teknillinen Korkeakoulu, Oct. 1996, 57 pages.
Lee et al. (4/12002), "Label Switching in Fibre Channel Networks," U.S. Appl. No. 10/114,394.
Listanti et al. (Sep. 2000), "Architectural and Technological Issues for Future Optical Internet Networks," Optical Solutions for Next-Generation Internet Networks, IEEE Communication Magazine.
Mearian et al., "What's After Fibre Channel?," ComputerWorld (webprint), XP002246206, 2003.
Mills, "Network Working Group Request for Comments 1059, Network Time Protocol (Version 1) Specification and Implementation," University of Delaware, pp. 1-50, Jul. 1988.
Monia, "iFCP—A Protocol for Internet Fibre Channel Storage Networking" Nishan Systems (webprint), P002246205, Dec. 12, 2000.
Monia et al., "iFCP—A Protocol for Internet Fibre Channel Storage Networking," Feb. 2002.
NCITS , "Fibre Channel Generic Services-3 (FC-GS-3)," working draft, Nov. 28, 2000.
NCITS, "Fibre Channel Switch Fabric-3 (FC-SW-3)," working draft (XP002300830 (A,B,C)), Feb. 29, 2003.
NCITS, "Fibre Channel Switch Fabric-2 (FC-SW-2)." working draft, Jun. 26, 2001.

Rajagopal et al., "IP and ARP Over Fibre Channel," Request for Comments: 2625 (webprint), XP002246207, Jun. 30, 1999.
Rangan, "Re: FCIP/1FCP: Gurantee In-Order delivery for FC N/NL_ports," IP Storage—Mailing List Archive (http://www.pdl.cmu/edu/mailinglists/ips/mail/msg03069.html webprint), Sep. 4, 2001.
Rosen et al. (Jan. 2001), "Multiprotocol Label Switching Architecture," Network Working Group, RFC 3031, XP002251364.
Valdevit, "Fabric Shortest Path First Version (FSPF) Rv. 0.2", Fabric Shortest Path (http://t11.org/index.htm webprint), XP002959525, May 23, 2000.
White, RFC 2925, IBM Corp, Sep. 2000.
Fabric Shortest Path First (FSPF) Project 1508-D Switch Fabric-3 Rev. 6.5, (http://t11/org/index.htm webprint), pp. 117-140 (Oct. 31, 2003).
AU Office Action (Mar. 16, 2007) from AU Patent Application No. 2002364204.
AU Office Action (May 23, 2007) from AU Patent Application No. 2003226093.
AU Office Action dated May 30, 2007 from AU Patent Application No. 2003226022.
AU Office Action, Application No. 2003245492, mailed Oct. 4, 2007.
AU Examination Report, Application No. 2003296301, mailed Jul. 14, 2008.
CN Office Action (Dec. 1, 2006) from CN Patent Application No. 02828262.0.
CN Office Action (Mar. 7, 2008) from CN Patent Application No. 03807560.1.
CN Office Action (Sep. 8, 2006) from CN Patent Application No. 03807600.4.
CN Office Action (Jun. 22, 2007) from CN Application No. 03813264.8.
EP Office Action (Jan. 18, 2005) from EP Patent Application No. 02799279.1-1525.
EP Office Action (Oct. 18, 2005) from EP Patent Application No. 02799279.1-1525.
EP Office Action (Feb. 20, 2006) from EP Patent Application No. 02799279.1-1525.
EP Office Action (Mar. 28, 2007) from EP Patent Application No. 03746053.2-2416.
EP Office Action (Apr. 5, 2006) from EP Patent Application No. 03739 127.3-2416.
EP Search Report (Feb. 10, 2006) from EP Patent Application No. 03746053.2-2416.
EP Search Report (Mar. 28, 2007) from EP Patent Application No. 03746053.2-2416.
EP Search Report (May 19, 2005) from EP Patent Application No. 03746062.3-1249.
EP Search Report (Apr. 5, 2006) from EP Patent Application No. 03 739 127.3-2416.
US Office Action (Oct. 17, 2006) from U.S. Appl. No. 10/114,394.
Japanese Application No. 2003-559086, Office Action dated May 19, 2008.
Japanese Application No. 2003-582973, Office Action dated Jun. 2, 2008.
Japanese Application No. 2003-582964, Office Action dated May 12, 2008.
US Office Action (Aug. 22, 2005) from U.S. Appl. No. 10/034,160.
US Final Office Action (Dec. 13, 2005) from U.S. Appl. No. 10/034,160.
U.S. Office Action (Jul. 30, 2007) from related U.S. Appl. No. 10/034,160.
US Office Action (Feb. 23, 2007) from U.S. Appl. No. 10/430,491.
US Final Office Action (Aug. 9, 2007) from U.S. Appl. No. 10/430,491.
U.S. Appl. No. 10/430,491 Notice of Allowance, Nov. 23, 2007.
U.S. Appl. No. 10/430,491 Notice of Allowance, Apr. 23, 2008.
U.S. Appl. No. 10/430,491 Notice of Allowance, Aug. 8, 2008.
U.S. Appl. No. 10/430,491 Supplemental Notice of Allowance, Aug. 26, 2008.
Allowed Claims for U.S. Appl. No. 10/430,491, Aug. 26, 2008.
US Office Action (Feb. 5, 2007) from U.S. Appl. No. 10/034,160.
US Office Action (Nov. 19, 2008) from U.S. Appl. No. 10/034,160.
US Office Action (Mar. 28, 2007) from U.S. Appl. No. 10/609,442.
US Final Office Action (Sep. 5, 2007) from U.S. Appl. No. 10/609,442.
US Office Action (Mar. 28, 2008) from U.S. Appl. No. 10/609,442.
US Office Action (Mar. 28, 2007) from U.S. Appl. No. 10/791,143.
US Office Action (Apr. 4, 2007) from U.S. Appl. No. 10/114,394.
US Office Action (Feb. 6, 2008) from U.S. Appl. No. 10/114,394.
US Office Action (Apr. 6, 2007) from U.S. Appl. No. 10/114,568.
US Office Action (May 22, 2006) from U.S. Appl. No. 10/114,568.
US Office Action (May 22, 2006) from U.S. Appl. No. 10/170,855.
Notice of Allowance (Dec. 6, 2006) from U.S. Appl. No. 10/170,855.
US Office Action (May 31, 2006) from U.S. Appl. No. 10/034,160.
US Office Action (Sep. 26, 2006) from U.S. Appl. No. 10/034,160.
US Office Action (Jan. 29, 2008) from U.S. Appl. No. 10/034,160.
WO Search Report (May 23, 2003) from International Patent Application No. PCT/US02/41072.
WO Search Report (Oct. 17, 2003) from International Patent Application No. PCT/US03/09328.
WO Search Report (Jul. 15, 2003) from International Patent Application No. PCT/US03/09442.
WO Search Report (Nov. 4, 2003) from International Patent Application No. PCT/US03/18765.
WO Search Report (Jul. 12, 2004) from International Patent Application No. PCT/US03/36452.
WO Written Opinion (Oct. 25, 2006) from International Patent Application No. PCT/US05/37763.
Armitage, Grenville, "MPLS: The Magic Behind the Myths," Jan. 2000, *IEEE Communications Magazine*, pp. 124-131. XP000908346.
U.S. Office Action dated Oct. 23, 2006 from related U.S. Appl. No. 10/114,568.
U.S. Final Office Action dated Sep. 20, 2007 from related U.S. Appl. No. 10/114,568.
U.S. Appl. No. 10/114,568 Notice of Allowance mailed Mar. 26, 2008.
U.S. Appl. No. 10/114,568 Allowed claims, Mar. 26, 2008.
Brocade Communication Systems, Inc. "Optimizing the performance and management of 2Gbit/sec SAN fabrics with ISL trunking", White paper, Online!, Mar. 2002.
Brocade Communication Systems, Inc. "Increasing Intelligence with the SAN Fabric", White paper, Online!, Jun. 2001 XP002251362.
Molero et al., "On the effect of link failure in fibre channel sotrage area networks", Parallel Architectures, Algorithms and Networks 2000, I-Span 2000 Proceedings, Int'l Symposium, Dec. 7-9, 2000.
U.S. Office Action dated Aug. 22, 2007 from related U.S. Appl. No. 10/114,394.
U.S. Final Office Action mailed Sep. 20, 2007.
U.S. Appl. No. 10/114,394, Final Office Action mailed Aug. 21, 2008.
U.S. Appl. No. 10/034,160 Office Action mailed Nov. 19, 2008.
U.S. Appl. No. 10/974,368 Office Action mailed Sep. 10, 2007.
U.S. Appl. No. 10/974,368 Notice of Allowance mailed May 1, 2008.
U.S. Appl. No. 10/974,368 Office Action mailed Sep. 12, 2008.
U.S. Appl. No. 10/979,886 Office Action mailed Nov. 25, 2008.
U.S. Appl. No. 10/979,886 Office Action mailed May 13, 2008.
U.S. Appl. No. 11/027,252, Final Office Action mailed Aug. 7, 2008.
U.S. Appl. No. 11/027,252 Office Action mailed Oct. 29, 2007.
U.S. Appl. No. 11/027,252 Office Action mailed Dec. 12, 2008.
U.S. Notice of Allowance dated Jul. 26, 2010 from related U.S. Appl. No. 10/979,886.
M. Rajagopal, R. et al., "Fibre Channel Over TCP/IP" Draft-IETF-IPS-FCOVERTCPIP-06.TXT, Mar. 1, 2002, pp. 1-46, XP015021184.
Monia, et al., "iFCP—A Protocol for Internet Fibre Channel Storage", DRAFT-MONIA-IPS-IFCP-01.TXT, Jan. 1, 2001, pp. 1-48, XP01502633.
International Preliminary Examination Report dated Aug. 7, 2003 issued to PCT/US02/41072.
PCT Written Opinion dated Oct. 27, 2004 from corresponding PCT/US2004/020518.
International Preliminary Report on Patentability dated Jan. 12, 2006 from corresponding PCT Application No. PCT/US2004/020518.

PCT International Preliminary Report on Patentability dated May 10, 2007 from related PCT/US05/037763.
CA Second Office Action dated May 11, 2009 for Canadian Application No. 2,480,462.
CA Third Office Action dated Feb. 8, 2010 for Canadian Application No. 2,480,462.
CA Third Office Action dated Apr. 30, 2010 for Canadian Application No. 2,521,463.
CN Third Office Action mailed Aug. 28, 2009 for U.S. Appl. No. 03807600.4.
CN Fourth Office Action mailed Feb. 5, 2010 for U.S. Appl. No. 03807600.4.
CN Second Office Action dated Oct. 16, 2009 for Application No. 03813264.8.
CN Third Office Action dated Nov. 20, 2009 for Application No. 200380104466.6.
EP Office Action dated Oct. 8, 2009 from related EP Application No. 03746053.2-2416.
EP Office Action dated Feb. 9, 2010 from related EP Application No. 03 746062.3-1249.
JP Office Action mailed Jul. 27, 2009 for Japanese Application No. 2003-582973.
KR Notification of Provisional Rejection dated Sep. 18, 2009 issued for KR Patent Application No. 2004-7015587 as stated in the letter from Kim and Cho dated Sep. 29, 2009.
KR Notification of Provisional Rejection dated Oct. 22, 2009 for Application No. 2004-7015583 as stated in the letter from Kim and Cho dated Oct. 28, 2009.
U.S. Notice of Allowance issued Jul. 7, 2010 from related U.S. Appl. No. 11/713,341.
U.S. Office Action dated Feb. 17, 2010 from related U.S. Appl. No. 12/202,004.
U.S. Notice of Allowance dated Feb. 13, 2009 from related U.S. Appl. No. 10/974,368.
U.S. Office Action dated Jan. 29, 2010 from related U.S. Appl. No. 10/979,886.
U.S. Notice of Allowance mailed Nov. 9, 2009 from related Application No. 11/027,252.

* cited by examiner

FIBRE CHANNEL SWITCH THAT ENABLES END DEVICES IN DIFFERENT FABRICS TO COMMUNICATE WITH ONE ANOTHER WHILE RETAINING THEIR UNIQUE FIBRE CHANNEL DOMAIN_IDS

RELATED APPLICATIONS

This Application is a Continuation under U.S. 35 §120 to patent application Ser. No. 10/609,442 filed Jun. 26, 2003, entitled "A Fibre Channel Switch That Enables End Devices In Different Fabrics To Communicate With One Another While Retaining Their Unique Fibre Channel Domain_IDs," all of which is incorporated herein for all purposes by this reference.

BACKGROUND OF THE INVENTION

1. Field of the Invention

The present invention relates to storage area networks, and more particularly, to a Fibre Channel Switch that enables the end devices in different Fabrics to communicate with one another while retaining their unique Fibre Channel IDs.

2. Background of the Invention

With the increasing popularity of Internet commerce and network centric computing, businesses and other organizations are becoming more and more reliant on information. To handle all of this data, storage area networks or SANs have become very popular. A SAN typically includes a number of storage devices, a plurality of Hosts, and a number of Switches arranged in a Switching Fabric that connects the storage devices and the Hosts.

Most SANs rely on the Fibre Channel protocol for communication within the Fabric. For a detailed explanation of the Fibre Channel protocol and Fibre Channel Switching Fabrics and Services, see the Fibre Channel Framing and Signaling Standard, Rev 1.70, American National Standard of Accredited Standards Committee (NCITS), Feb. 8, 2002, and the Fibre Channel Switch Fabric—2, Rev. 5.4, NCITS, Jun. 26, 2001, and the Fibre Channel Generic Services—3, Rev. 7.01, NCITS, Nov. 28, 2000, all incorporated by reference herein for all purposes.

In Fibre Channel, each device (Hosts, storage devices and Switches) is identified by a globally unique, eight (8) byte wide World Wide Name (WWN) assigned by the manufacturer. There are two kinds of WWNs used in FC networks. If you consider a device with one or more FC adapters (or HBAs or ports) to connect to a FC network, every device is assigned a node WWN (nWWN) and each adapter is assigned a port WWN (pWWN). The nWWN and pWWN are different from each other. When the Fibre Channel devices are interconnected to form a SAN, the WWN (along with other parameters) is the primary mechanism to identify each device. Fibre Channel frames are used for communication among the devices in the SAN. The WWN, however, is not used by the frames. Each adapter or port must login to the FC network. At this time, each port is dynamically assigned a unique Fibre Channel address (FC_ID) by the Fabric. The FC_ID is used in FC networks for end devices to address each other.

The three byte wide Fibre Channel addresses are hierarchically structured in three fields, each one byte long: Domain_ID, Area_ID, and Port_ID. Each Switch within the Fabric is assigned a Domain_ID. The end devices attached to a particular Switch are assigned the Domain_ID of that Switch. The Switch manages the allocation of the Area_ID and Port_ID fields for each end device to guarantee the uniqueness of the assigned addresses in that Domain. For example, if a Switch is assigned a Domain number five and the Switch subdivides its address space in two areas each having three connected end devices, then a possible Fibre Channel address allocation is: 5:1:1, 5:1:2, 5:1:3, 5:2:1, 5:2:2, and 5:2:3.

Fibre Channel based SANs are often organized into zones. Within each zone, Hosts can see and access only storage devices or other Hosts belonging to that zone. This allows the coexistence on the same SAN of different computing environments. For example, it is possible to define on a SAN a Unix zone and a separate Windows zone. Unix servers belonging to the Unix zone may access only storage or Hosts devices within the Unix zone, and do not interfere with the other devices connected to the SAN. In the same manner, Windows servers belonging to the Windows zone may access storage or Hosts devices only within the Windows zone, without interfering with the other devices connected to the SAN. The SAN administrator may define in a SAN multiple zones, as required or dictated by the computing and storage resources connected to it. The Switching Fabric allows communications only between devices belonging to the same zone, preventing a device of one zone from seeing or accessing a device of another zone.

The information infrastructure within a large enterprise will typically have a number of SANs, each dedicated for a different organization or application within the enterprise. For example, a large corporation may have different SANs for corporate, for the sales department, the marketing department, etc. Each SAN will typically include redundant Fibre Channel fabrics connecting a plurality of Hosts and storage devices. The redundant Switches in the Fibre Channel fabrics are provided in the event a Switch or link in one Fabric goes down. If this were to occur, the redundant fabric would be used enabling normal operation of SAN. Another example is the use of a dedicated SAN for managing a mail server such as Microsoft Exchange.

The aforementioned arrangement has a number of disadvantages. Foremost, the Hosts in a given SAN can communicate only with the storage devices in that same SAN. There is no way that a Host in one SAN can directly communicate with a storage device in a second SAN. This arrangement is not only inefficient, it is expensive. Since storage devices cannot be shared among SANs, separate storage devices are required for each SAN.

The above-identified parent application partially addresses this problem by introducing the concept of a Virtual SAN or "VSAN". The implementation of a VSAN is based on the concept of dividing the switching fabric of a single physical SAN into logical SANs, each called a VSAN. The properties of each VSAN are similar to a standard SAN, in particular: (i) unicast, broadcast and multicast traffic is confined to a VSAN and does not span multiple VSANs; (ii) Fibre Channel identifiers (FC_IDs) are assigned per VSAN. This means that a given FC address may be assigned to two different Hosts in two different VSANs; and (iii) routing and distributed Fabric Services, such as Name Server, Zone Server, etc. are maintained independently for each VSAN. This results in constraining the effect of a configuration or topology change to only the affected VSAN. Within each VSAN, a frame is forwarded as in any normal SAN, using the FC_ID.

One known solution for enabling end devices in different VSANs to communicate with one another involves the virtualization of the end devices so that there are "local instances" of each end device in the Fabric within each VSAN. See for example US Patent Publication 2003/0012204. One problem with this approach is that the border Switches between the VSANs perform FC_ID translations (i.e., Network Address translations or NATs) for the source and destination end devices. If a border Switch goes down, an alternative or fail-over path needs to be created. In addition, with certain frames, both the source and/or destination FC_IDs may be defined in the payload. A mechanism that identifies and translates these IDs must therefore be provided. This solution also does not work if encryption or a proprietary protocol is used between the source and destination end devices because there is no way for the border Switches to process the proprietary payloads or de-crypt the frames to identify the source and destination FC_IDs.

A Fibre Channel Switch and Fabric is needed which enables end devices in different Fabrics to communicate with one another while retaining their unique Fibre Channel Domain_IDs.

SUMMARY OF THE INVENTION

To achieve the foregoing, and in accordance with the purpose of the present invention, a Switch is disclosed which enables end devices in different Fabrics to communicate with one another while retaining their unique Fibre Channel Domain_IDs. The Switch is coupled to a first fabric having a first set of end devices and a second fabric having a second set of end devices. The Switch is configured to enable communication by the first set of end devices associated with the first fabric with the second set of end devices associated with the second fabric using the unique Domain_IDs of each of the first set and the second set of end devices. In one embodiment of the invention, the first and second fabrics are first and second Virtual Storage Area Networks (VSANs) respectively. In an alternative embodiment, the first fabric and the second fabric are separate physical fabrics.

DETAILED DESCRIPTION OF THE PREFERRED EMBODIMENTS

In the following description, numerous specific details are set forth in order to provide a thorough understanding of the present invention. It will be obvious, however, to one skilled in the art, that the present invention may be practiced without some or all of these specific details. In other instances, well known process steps have not been described in detail in order not to unnecessarily obscure the present invention.

In a Fibre Channel SAN, the main services provided by the fabric include: Dynamic Address Allocation, Routing, Name Service Zone Service, and event notification. The present invention relates to Inter-VSAN and/or Inter-Fabric routing using unique Domain_IDs. Terminology specific to the present invention and defined herein includes:

Inter-VSAN Zone—a zone that contains members from multiple VSANs.

VSAN Border Switch—a switch that routes traffic to and from a pair of VSANs.

Non-adjacent VSANs—two VSANs are considered non-adjacent on a link if the link does not carry traffic between the two VSANs.

Transit VSAN—a VSAN used to carry traffic across a link between two or more non-adjacent Edge VSANs. Transit VSAN(s) thus straddle non-adjacent VSANs and enables them to communicate with one another. With this arrangement, a physical SAN is divided into lower level VSANs and high level Transit VSAN(s) for handling switching between the VSANs.

Edge VSAN—is a VSAN from which traffic is switched to or from a Transit VSAN. An Edge VSAN can be a Transit VSAN.

Figure 1:
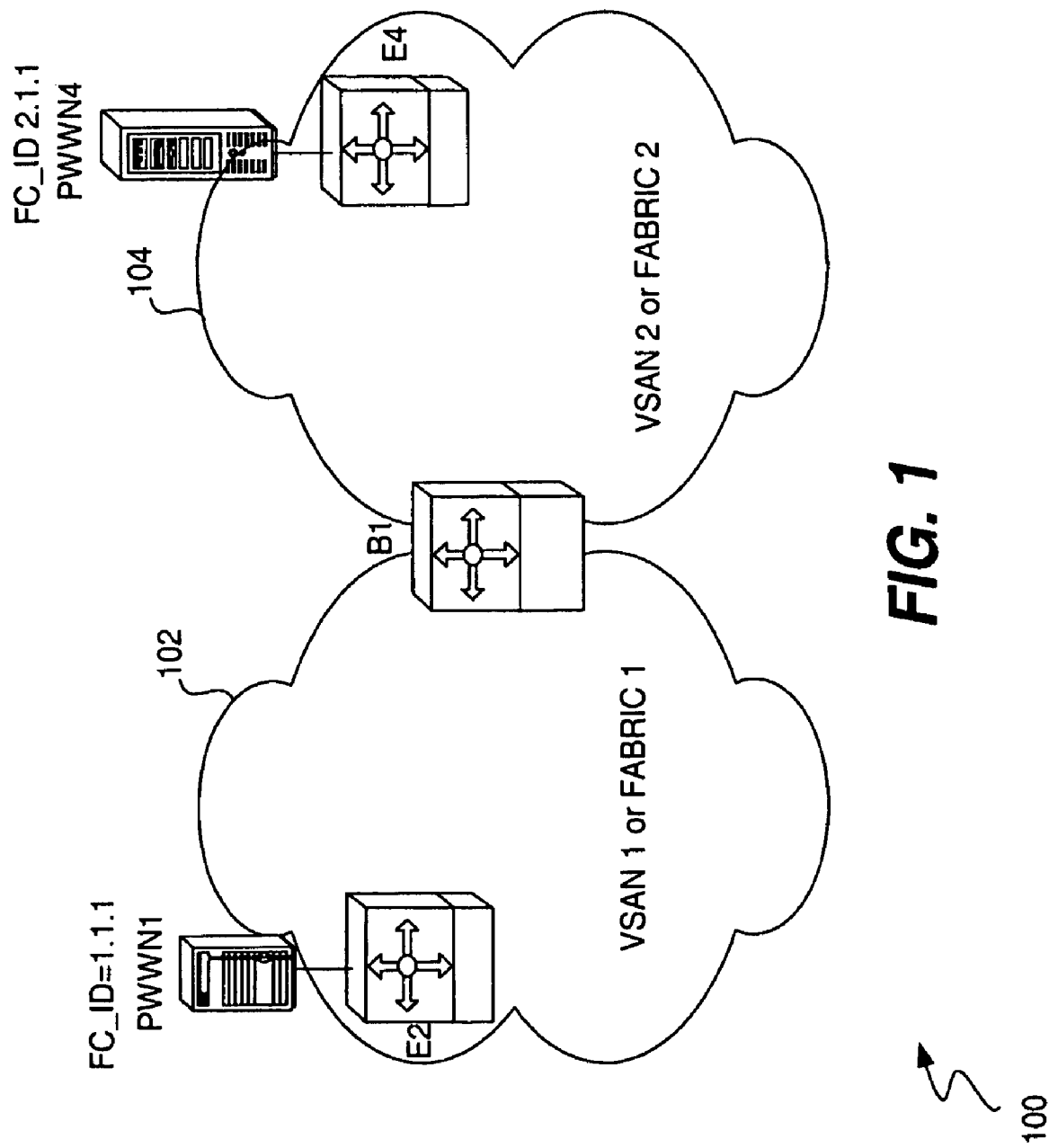
FIG. 1 is an exemplary Fibre Channel Fabric according to the present invention.

Referring to FIG. 1, a simplified Storage Area Network (SAN) 100 according to the present invention is shown. The SAN 100 includes a first VSAN 102 and a second VSAN 104. The first VSAN 102 includes a Switch E2 and an end device pWWN1 with a FC_ID address of 1.1.1. The second VSAN 104 includes a Switch E4 and an end device pWWN4 with a FC_ID address of 2.1.1. A border Switch B1 is also included in each VSAN. VSAN 102 and VSAN 104 are shown with only one Switch and one end device each for the purposes of illustration. It should be understood that the SAN 100 can be divided into many more VSANs, with each VSAN including one or a plurality of Switches and a set of end devices (hosts and/or storage devices where the number in the set may range from one to a multiplicity of end devices.

With the present invention, the end devices pWWN1 and pWWN4 can communicate with one another while retaining their respective FC_ID addresses. This is accomplished through the Border Switch B1 that straddles both VSANs. In a single step process, packets originating from end device pWWN1 are injected from VSAN 102 to VSAN 104 and pWWN4, and vice-versa, through the border Switch B1.

It should be noted that as used herein, the term "Fabric" generally implies a single physical Fabric that is divided into separate Virtual SANs. The two VSANs 102 and 104 as illustrated in FIG. 1, could also be two physically separate Fabrics or SANs. In either case, the Border Switch enables the end devices pWWN1 and pWWN4 to communicate with one another while retaining their respective FC_ID addresses. For the remainder of the present application, the invention is described in relation to VSANs of a single Fabric or SAN. It should be understood, however, that the present invention as taught herein can be used with two separate Fabrics or SANs.

The Inter-VSAN routing using unique Domain_IDs of the present invention initially requires an administrator to define one or more Inter-VSANs and the end devices that can communicate with one another in the Fabric. After the Fabric is configured, the Border Switches: (i) exchange the Inter-VSAN routing protocol (IVRP) messages with the other Border Switches in the fabric in order to determine the topology and shortest paths to the different VSANs. In the absence of a routing protocol, a static configuration is needed to decide the set of VSANs that must be transited by frames from an originating Edge VSAN to a terminating Edge VSAN; (ii) exchange Fabric Shortest Path First (FSPF) information between the neighbor Switches in each VSAN and the neighbor VSANs. Specifically, Border Switches inject routes into either Transit VSANs; and/or Edge VSANs connected to the Border Switch; (iii) propagate FSPF updates between the Edge and Transit VSANs only if the updates affect routes and link cost to any of the exported Domain_IDs; (iv) exchange zoning information with its neighbor Switches on linkup; (v) exchange name server databases with its neighbor Switches. Only those entries in the Inter-VSAN zone relevant to a VSAN are exchanged across VSANs; (vi) proxy as the name server for each switch in a remote Edge VSAN for queries received from Switches in the local VSAN; (vii) translates the VSAN of a frame received from an Edge VSAN to the Transit VSAN for outbound traffic and conversely translates the VSAN of a received frame from the Transit VSAN to the appropriate Edge VSAN; and (viii) terminates all control traffic including FSPF, zone server, and name server in the adjacent Edge VSAN. Each of the functions performed by the Border Switches is defined in more detail below.

Figure 2:
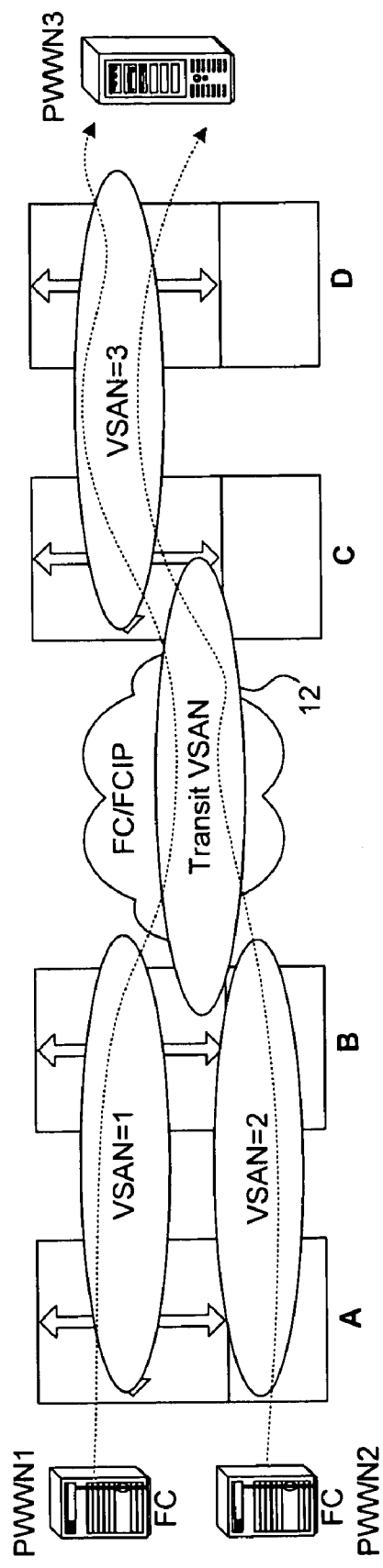
FIG. 2 is an exemplary VSAN topology according to the present invention.

Referring to FIG. 2, an exemplary SAN according to the present invention is shown. The SAN 10 in this example includes three Edge VSANs (VSAN=1, VSAN=2, and VSAN=3), a Transit VSAN, four switches A, B, C, and D and three end devices, pWWN1, pWWN2 and pWWN3. Host pWWN1 is included in VSAN1. A second Host pWWN2 is included in VSAN2. A storage device pWWN3 is included in VSAN3. The Transit VSAN 12 is used to switch traffic between the disconnected Edge VSAN1, VSAN2, and VSAN3. The Transit VSAN 12, as is described below, enables the Hosts pWWN1 and pWWN2 to access the storage device pWWN3 and vice versa. In Fibre Channel, end devices such as Hosts and storage devices communicate using only Fibre Channel addresses. With the development of the VSAN, as described in detail in the above-identified parent application, a tag qualifies a Fibre Channel address so that it can be routed through the Switching Fabric, while being transparent to the end devices.

The Transit VSAN 12 switches traffic from the disconnected Edge VSAN pairs 1-3 and 2-3 and vice-versa. The link between the Switches B and C can be according to various embodiments a standard FC link or remote (e.g., FCIP, FC over DWDM, etc) link. The transit VSAN 12 is similar to any other VSAN and can potentially have its own end devices attached to it. The Transit VSAN 12 does not care about the nature of the neighbor Edge VSANs that it is switching traffic either to or from. In other words, a transit VSAN can switch traffic to or from another transit VSAN.

Figure 3:
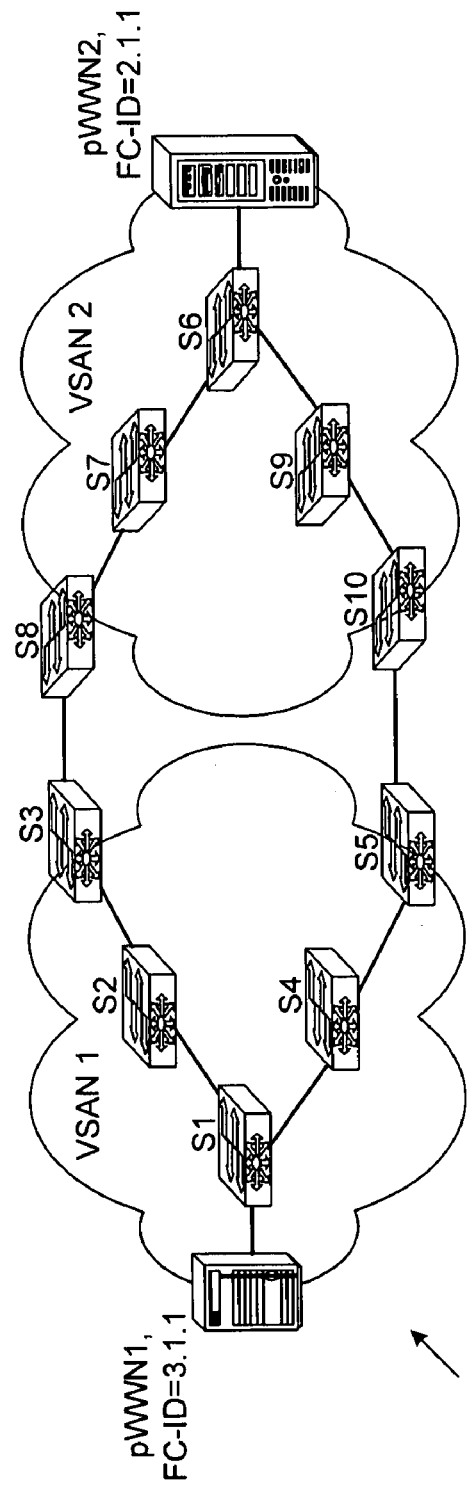
FIG. 3 is another VSAN topology illustrating VSAN border switches.

Referring to FIG. 3, another SAN 20 topology illustrating Border Switches is shown. Border Switches are switches that link between or are part of both an Edge VSAN(s) and a Transit VSAN(s). In this example, VSAN1 includes a Host (pWWN1, FC_ID=3.1.1) and Switches S1 through S5. VSAN2 includes a storage device (pWWN2, FC_ID=2.1.1) and Switches S6 through S10. Assuming that a Transit VSAN includes Switches S2, S3, S4, S5, S8 and S10, then S2 and S4 are considered Border Switches even though they are not necessarily at the border of VSAN1. Traffic coming from the Transit VSAN to VSAN 1 is by Switch S3 and traffic from Switch S1 and directed to the Transit VSAN is switched by S4. Similarly, Switches S8 and S10 are Border Switches for VSAN2. In yet another example, Switches B and C are defined as Border Switches in FIG. 2 because they are capable of switching traffic between the Transit VSAN 12 and VSAN1, VSAN2 and VSAN3.

Figure 4A:
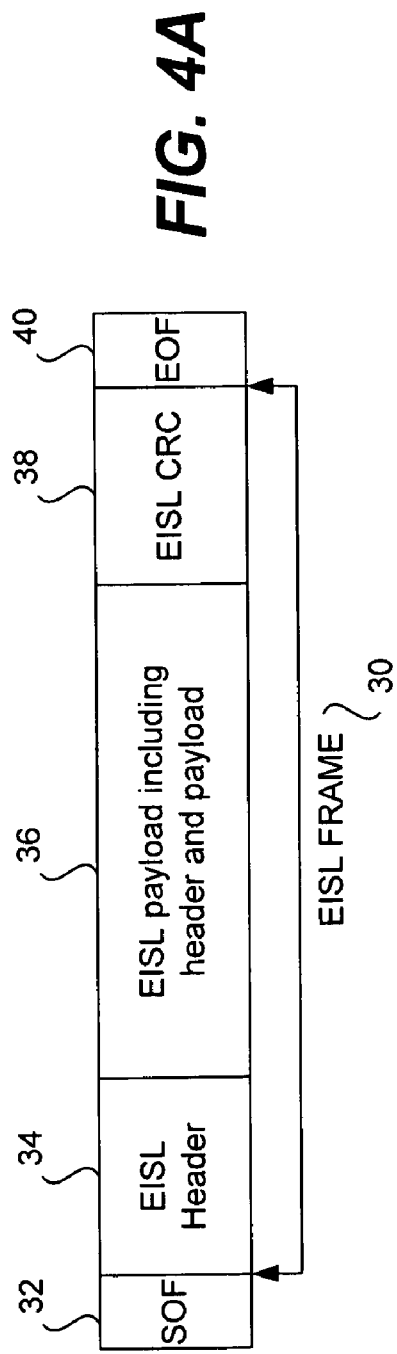
FIGS. 4A and 4B is an exemplary Fibre Channel frame modified for Inter-VSAN routing according to the present invention.

Referring to FIG. 4A, a frame 30 having an Extended Inter-Switch Link (EISL) format for use typically on a link carrying multiple VSANs is shown. While the EISL format can also be used on a link carrying a single VSAN, another option on a link carrying only a single VSAN, is to configure the ingress port of the switch with the VSAN to be associated with frames received on that port. The frame 30 includes a Start of Frame (SOF) field 32, an EISL header field 34, an EISL payload field 36, an EISL Cyclical Redundancy Check (CRC) field 38, and a End of Frame (EOF) field 40. The SOF field 32 is the start of the frame delimiter. The EISL payload field 36 includes the header and payload used with a standard ISL frame. The EISL CRC field 306 is used to hold a CRC value specific to the EISL.

The EISL CRC value differs or is a modification of a standard CRC value calculated for a regular ISL frame due to the corresponding longer length of the EISL frame 30 with the appended EISL header field 34. The EOF field 40 delineates the end of the frame 30.

Figure 4B:
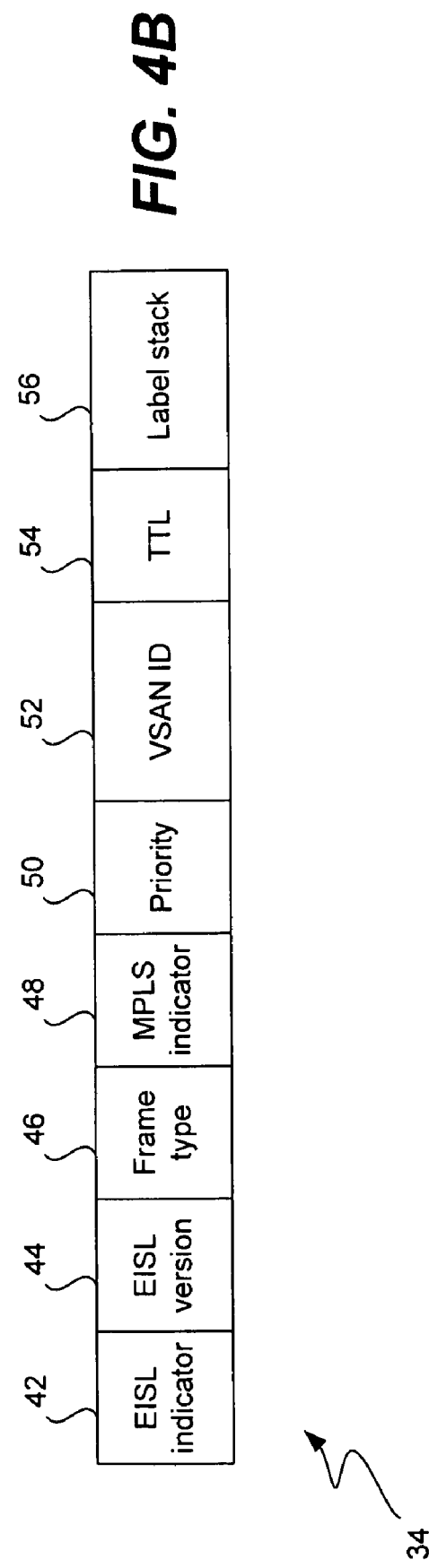

Referring to FIG. 4B, the EISL header field 34 is illustrated. This field includes a plurality of sub-fields including an EISL indicator field 42 for indicating the presence of an EISL header field 34, an EISL version field 44 that indicates the version of EISL header. In one embodiment, the version field 44 is at least two bits wide, allowing the indication of up to four versions of EISL frames. Additional bits may be used if more versions of EISL frames need to be indicated. The frame type field 46 is used to indicate the type of traffic to be carried by the frame. Traffic types may include for example Ethernet, Fibre Channel, or Infiniband. In one embodiment, the frame type field 46 is four-bits wide, allowing up to sixteen different traffic types to be transmitted across the Fabric. Moreover, multiple VSANs, each capable of transmitting different traffic types, may be interconnected through the identification of a traffic type as provided in this field. The Multi-Protocol Label Switching (MPLS) field 48 indicates if the frame is carrying MPLS information such as label stack 56, which is a common forwarding mechanism for both Fibre Channel and Ethernet. In one embodiment, the MPLS field 48 is one bit wide. When set, it indicates that the EISL header 34 includes an MPLS label stack 56. Otherwise it is reset.

Priority field 50 indicate the user priority of the EISL frame 30. Priority may be defined in a number of ways. As one example, the user priority may be a generic numeric priority, without a guaranteed level of service. For instance, higher values represent higher user priority while lower values may represent lower priority. Higher priorities receive available bandwidth first, regardless of how much total bandwidth is available. As another example, the user priority may indicate a quality of service (QoS) of the payload of the EISL frame. Generally, the width of the Priority field 50 depends on the priority type and/or the number of priority levels.

The VSAN identifier field 52 or "tag" is used to identify the frame 30 as belonging to a particular VSAN. More particularly, the VSAN identifier field 52 identifies the payload of the EISL frame 30 as belonging to a particular VSAN. In accordance with one embodiment, the VSAN identifier field 412 is a twelve-bit wide field. The format of the identifier may be identical to or similar to VLAN identifiers as well as similar to addresses employed in certain standard protocols such as Ethernet.

In some SANs, there may be topology as well as routing problems that could cause a frame to traverse a loop within the network. Such a loop will consume bandwidth unnecessarily. In order to address this problem, a Time To Live (TTL) field 54 may be used to indicate a TTL value specifying the number of remaining hops that can be traversed before the frame is dropped. The TTL value inserted into field 54 is initialized by the network device (e.g., a Switch) that generates the EISL frame 30. A TTL default value is initially set to an arbitrary number, for example sixteen. With each hop, subsequent network devices (e.g., Switches) receiving the EISL frame decrement the TTL value by one. A TTL value of one indicates to the receiving network device (e.g., Switch) that the EISL frame should be dropped. When the EISL frame is dropped, an error message may be sent to the intended recipient of the frame as well as to the sender of the frame. Similarly, a TTL value of 0 may indicate that the TTL field 54 should be ignored, allowing the EISL frame to be forwarded by the switch.

On a link carrying multiple VSANs, Switches communicate using frames 30. Each frame 30 also includes, in addition to the above, the Fibre Channel addresses (FC_IDs) of the source and destination end devices. The VSAN ID 52 qualifies a particular frame 30 as belonging to a particular VSAN, transparent to the end devices. For more information on the switching of frames 30 within a VSAN, see the aforementioned parent application.

Figure 5:
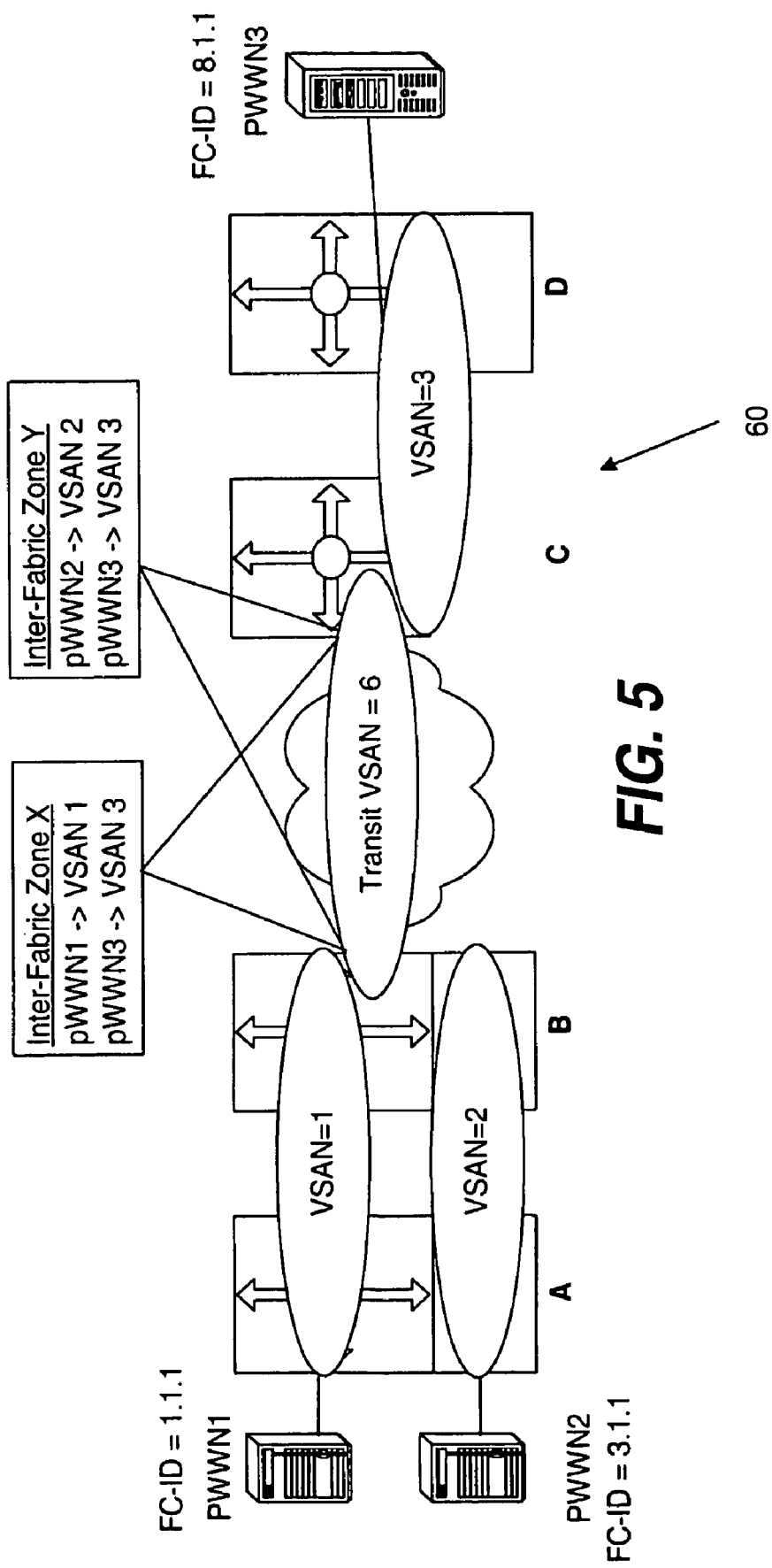
FIG. 5 is an exemplary SAN defining "Inter-VSAN zones" according to the present invention.

Referring to FIG. 5, a VSAN 60 including "Inter-VSAN zones" according to the present invention is shown. An Inter-VSAN zone is defined as a zone that has members from multiple VSANs. In this example, Inter-VSAN zone X includes Host pWWN1 (FC_ID 1.1.1) in VSAN 1 and storage device pWWN3 (FC-ID 8.1.1) in VSAN 3. Inter-VSAN zone Y includes Host pWWN2 (FC_ID 3.1.1) in VSAN 2 and the same storage device pWWN3 (FC-ID 8.1.1) in VSAN 3. Inter-VSAN zones X and Y have thus been created so that Hosts pWWN1 and pWWN2 can both communicate with storage device pWWN3 respectively.

Using the inter-VSAN zone, Border Switches decide: (i) the content of the name server database that is exported into the Transit VSAN from the adjacent Edge VSAN and vice versa; (ii) the set of FSPF domains to export in Link State Update (LSU) messages; (iii) the set of addresses to switch from adjacent Edge VSANs to Transit VSANs and vice versa; (iv) the set of adjacent Edge VSANs to which SW_RSCNs received from a Transit VSAN are propagated; (v) the set of SW_RSCNs received from adjacent Edge VSANs to propagate into the Transit VSAN. In other words, the Inter-VSAN zone is the point from which the import and export data and control traffic occurs. Since zone configuration is a well known concept, the configuration of Inter-VSAN routing via Inter-VSAN zones simplifies management and administration in the Fabric.

Similar to a regular zone in a VSAN, Inter-VSAN zones are contained within a zoneset and there is an active zoneset. The Border Switches thus determine the import and export traffic from the Inter-VSAN zones in the active zoneset.

In a typical SAN, a number of protocols are implemented when a link is established between two Switches. These include the Port Manager; Domain Manager; Zone Server; Fabric Shortest Path First (FSPF); Name_Server; and Switch Register State Change Notification (SW_RSCN) protocols, as described in the above-referenced NCITS documents. The aforementioned protocols have been modified for Inter-VSAN routing as contemplated with the present invention as described below.

Port Manager Protocol: The Port manager protocol negotiates parameters between two Switches and determines if the link is an Inter-Switch Link (ISL) or an Extended Inter-Switch Link (EISL). If the link is EISL, then it means that the link is capable of carrying VSAN frames. Otherwise, the Port Manager protocol operates the same with VSANs as with a regular SAN.

Domain Manager Protocol: The Domain Manager Protocol is responsible for the allocation of Domain_IDs and/or Fibre Channel addresses (FC_ID) for each Switch, Host and storage device in the SAN. As noted above, a FC_ID includes three components, a Domain_ID, an Area_ID, and a Port_ID.

During initialization, a Principal Switch is selected for the SAN. The Principal Switch is responsible for assigning a Domain_ID for each Switch. Each Switch is then responsible for selecting the Area_ID and Port_ID for each end device connected to that Switch.

According to the present invention, the domain number space must be unique across the VSANs that are going to communicate with one another. There are a number of ways in which this uniqueness can be maintained, including: (i) administratively partitioning the domain number space across the VSANs; or (ii) associate a set of Domain_IDs to be used only for Inter-VSAN routing. For example, Domain_IDs between 200-239 (or any other arbitrary range) can be dedicated for VSAN routing. A Switch that needed to communicate across VSANs could administratively be configured to request Domain_IDs in the dedicated number space range.

Zone Server Protocol: In a standard SAN, the Zone Server Protocol is responsible for creating and maintaining a database within each Switch that defines each zone in the SAN. The zones in the table are defined in terms of the Host(s) and storage device(s) in each zone. A Host and/or storage device can belong to multiple zones. To ensure a consistent zoning database across a SAN, when an ISL link comes up between two switches, the zone database is exchanged between the switches to ensure consistency and to prevent conflicting zone definitions. If there are no conflicts, the zone databases are merged. If there are conflicts, the link is isolated and no data traffic can flow through that link until the conflicts are resolved. As part of the zone server protocol, whenever a zone is added, deleted or modified, the changes are propagated throughout the Fabric.

To support Inter-VSAN routing, the Zone Server Protocol is modified to accommodate Inter-VSAN zones having members in different VSANs. Further, existing mechanisms or new mechanisms can be devised to ensure consistency of inter-VSAN zones. Since VSANS are terminated at the border switches, intra-domain zones are not propagated to the Transit VSAN.

Fabric Shortest Path First (FSPF) Protocol: The FSPF is a link state path selection protocol. FSPF keeps track of the state of the links on all the Switches in the Fabric and associates the cost with each link. The protocol computes paths from each Switch to all the other Switches in the Fabric by adding the cost of all the links traversed by the path, and choosing or selecting the path that minimizes the cost. The collection of the link state records (LSR's) (including the cost) of all the Switches in the Fabric constitutes the topology database of the Fabric, called the Link State Database.

The FSPF protocol has four major components, including: (i) a "Hello" protocol used to establish connectivity between neighbor Switches, to establish the identity of neighbor Switches, and to exchange FSPF parameters and capabilities between the neighbor Switches; (ii) a replicated fabric topology or Link State Database, with protocols and mechanisms to keep the databases synchronized across the Fabric; (iii) a path computation algorithm; and (iv) a routing table update.

The Link State Database synchronization in turn consists of two major components, an initial database synchronization and an update mechanism. The initial database synchronization is used when a Switch is initialized or when an inter-Switch Link (ISL) comes up. The update mechanism is used when either (i) there is a link state change, for example when an ISL goes up or down; or (ii) on a periodic basis, to prevent Switches from deleting topology information from the database.

With the FSPF protocol, the term "path selection" indicates the lowest cost or "best" path between a source and destination in the Fabric. The term "routing" indicates the actual forwarding of frames to a specific destination. FSPF performs hop-by-hop routing, which means that a Switch in the Fabric only needs to know the next hop on the best path to the destination. The replicated topology database insures that every Switch in the Fabric has the same definition of the Fabric, and therefore, all the Switches will make consistent routing decisions. Typically, a Switch needs to know, for each destination domain in the Fabric, which path should be used to route a frame to a domain. A routing table entry therefore requires at a minimum a destination Domain_ID and an E_Port to which frames are forwarded.

Since the FSPF protocol is contained within a VSAN, in order to support routing for domains that are in other VSANs, the following modifications are implemented:

For each Domain_ID of a device that is part of an inter-VSAN zone, a border switch considers the Domain_ID for announcement into the adjacent VSANs. An adjacent VSAN may be a transit VSAN or an edge VSAN. A thus selected Domain ID is announced into an adjacent VSAN if either that VSAN is a transit VSAN or there is a device in the VSAN that is part of the same inter-VSAN zone.

In addition to this, a border switch rewrites the VSAN of a frame that is being routed across VSANs to that of the adjacent VSAN. So, for frames being routed from an edge VSAN to a transit VSAN, a border switch rewrites the VSAN from the edge VSAN to the transit VSAN.

Figure 6:
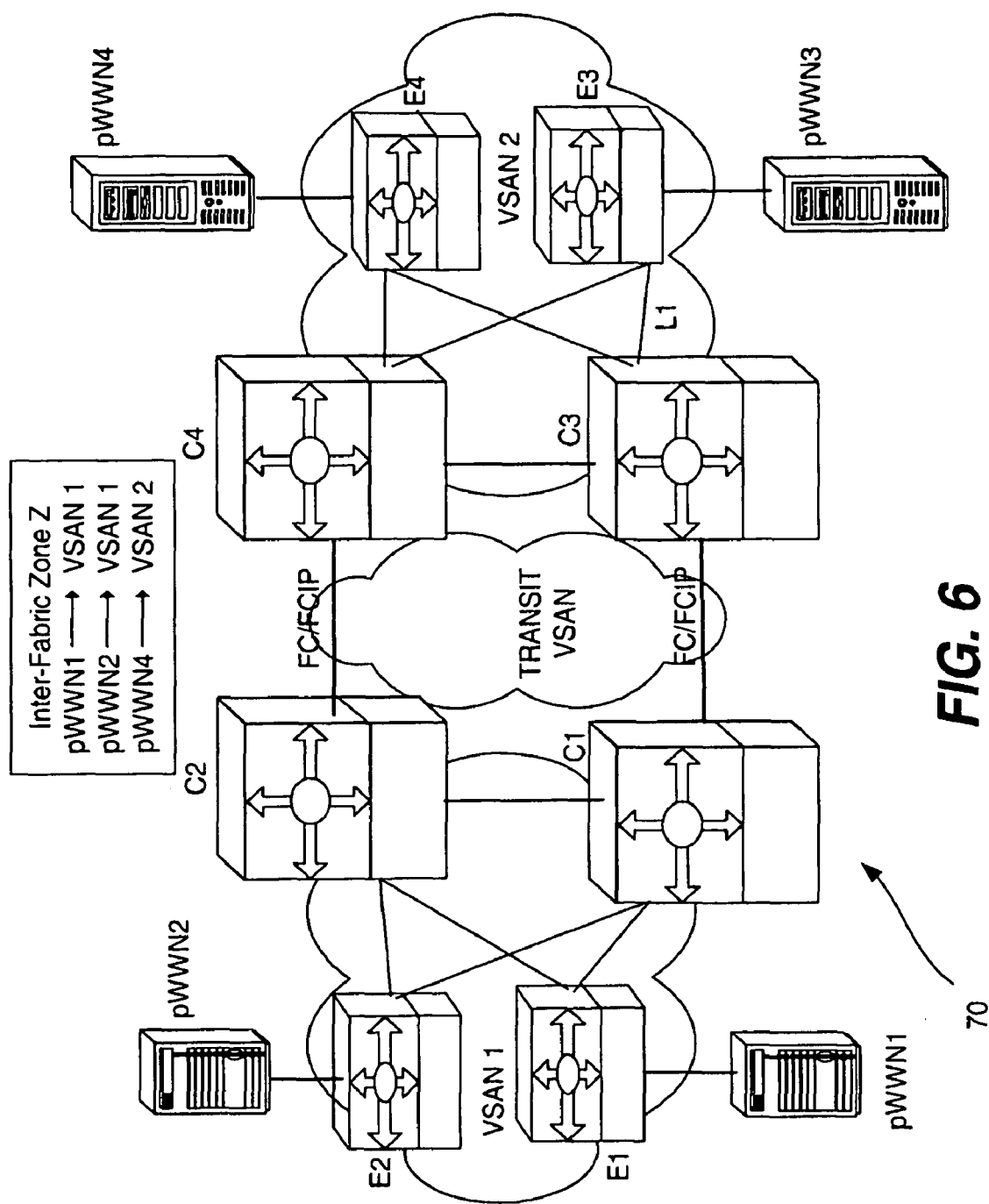
FIG. 6 is an exemplary VSAN for illustrating the modifications to the FSPF protocol according to the present invention.

Referring to FIG. 6, an exemplary SAN 70 useful for illustrating the modifications to the FSPF protocol is shown. The SAN 70 includes VSAN1, VSAN2, a transit VSAN and an inter-fabric zone Z with members pWWN1, pWWN2 and pWWN4. With a standard SAN, Switch C4 would announce the LSRs of its Link State Database to itself, Switch C3, Switch E3, and Switch E4, where each of the LSRs would contain information about all the links connected to the Switch C4. With Inter-VSAN routing, Switch C4 announces only a route for Switch E4 with a link cost. Similarly, Switch E3 would announce only a route for E4. Similarly, switches C1 and C2 each announce a route for E2 and E1. On receiving a route announcement from Switches C3 and C4, Switch C1 and C2 announce the route for Switch E4 obtained from the Transit-VSAN into VSAN 1. Likewise, Switches C3 and C4 announce the route for Switches E1 and E2 into VSAN 2. From the forwarding table perspective, Switches C1 and C2 have to change the VSAN for frames destined to E4 from VSAN1 to the Transit VSAN. In the opposite direction, they will change the VSAN for frames received for Switches E1 and E2 from the Transit VSAN to VSAN1. Similarly, Switches C3 and C4 will change the VSAN for frames destined to E1 and E2 from VSAN 2 to the Transit VSAN and change the VSAN for the frames received for Switch E4, from the Transit VSAN to VSAN 2.

Name Server Protocol: With the Name Server Protocol, each Switch exchanges information regarding its locally attached end devices with the other Switches in the SAN. The information that is exchanged for each end device includes the world wide name (pWWN), the Fibre Channel address (FC_ID), the type of protocol (SCSI, IP, etc.) the end device supports, and if the end device is an initiator (i.e., a Host) or a target (i.e., a storage device).

To support Inter-VSAN routing, the changes to the name server on a Border Switch are: (i) build the list of name server entries to be exported to a Transit VSAN or Edge VSAN. This list is created from the defined Inter-VSAN zones, and (ii) terminate and proxy name server queries for the domains associated with the remote domain and respond on behalf of the name server of the queried Switch.

Referring again to FIG. 6, the modification rules of the Name Server Protocol can be illustrated by way of examples.

1) Switches C1 and C2 add to the Name Server database in the Transit VSAN the devices pWWN1 and pWWN2. Similarly, Switches C3 and C4 add pWWN4 to the Name Server database in the transit VSAN. When C4 announces the route to domain E3 in the transit VSAN and C1 and C2 receive this announcement, each of them send a name server query for information about all attached end devices to E3 to the name server of E3 as specified by the FC standards. Depending on the route taken by the query, either C3 or C4 intercept this query and respond on behalf of E3 with information only about pWWN4. Likewise, when C1 and C2 announce the route to domains E1 and E2, it is received by C3 and C4. C3 and C4 then send name server queries to E1 and E2 which are intercepted by C1 or C2 which proxy and respond on behalf of the name server for the announced domains. C1 and C2 respond only with information about pWWN1 for queries to E1 and with pWWN2 for queries to E2.

2) A similar process occurs in VSAN 1 when the route to domain E4 is announced by C1 and C2. Each switch in VSAN 1, in this case, E1 and E2, send name server queries for all attached end devices to E4 to the name server of E4. Depending on the route taken by the query, either C1 or C2 intercept the query and respond with information only about pWWN4.

3) A similar process as above occurs in VSAN 2 when C3 and C4 announce routes to domains E1 and E2.

4) If a device is added to an already announced domain or if the state of the device announced changes, notification of a change is conveyed via SW_RSCN. When a switch receives an SW_RSCN, it generates a name server query to the switch to which the end device identified in the SW_RSCN is attached. This query is also intercepted and responded to by the border switches.

Register State Change Notification (SW_RCSN) Protocol

SW_RSCNs are exchanged between switches whenever the name server database changes. The change is usually due to a change in the state of a locally connected port, a locally connected switch or to the zone server database. SW_RSCNs are originated by the Switch detecting the change and sent to every other Switch in the VSAN. The SW_RSCN contains information about the affected end devices or Domain_ID (Domain_ID is used when changes affect the entire switch as specified in the FC-MI Technical Report, incorporated by reference herein for all purposes. This information includes the port WWN of the end device and its FC_ID. An SW_RSCN can contain notification about multiple end devices.

With Inter-VSAN routing, changes in one VSAN must be propagated to other VSANs if the change affects a device in an Inter-VSAN zone. Consider the topology in FIG. 6. If switch E4 loses the connection to pWWN4, it transmits an SW_RSCN to C3 and C4. Since pWWN4 is in a Inter-VSAN zone and C3 and C4 are Border Switches, they both will propagate the SW_RSCN to the Transit VSAN. This is received by both C1 and C2 which in turn propagate the SW_RSCN in VSAN 1. Thus, duplicate SW_RSCNs are generated which is inefficient.

The replication of SW_RSCN frames can be prevented by selecting a single Switch to be responsible for distributing SW_RSCN from one VSAN to another. The selection of such a switch can be done in multiple ways, for example, either: (i) statically configured by a system administrator; (ii) selecting the principal Switch in a VSAN to be designated as the Switch for distributing SW_RSCNs; (iii) the border switches can then announce the SW_RSCN from an adjacent VSAN to only the principal switch which then distributes the SW_RSCN within its VSAN or (iv) one of the Border Switches can be selected based on some scheme such as shortest path to the VSAN for which it is advertising, the switch with the highest "switch WWN" etc. Regardless of the responsible Switch, each switch receiving a SW_RSCN notifies registered end hosts of the change as per normal RSCN rules.

EXAMPLES

Figure 7:
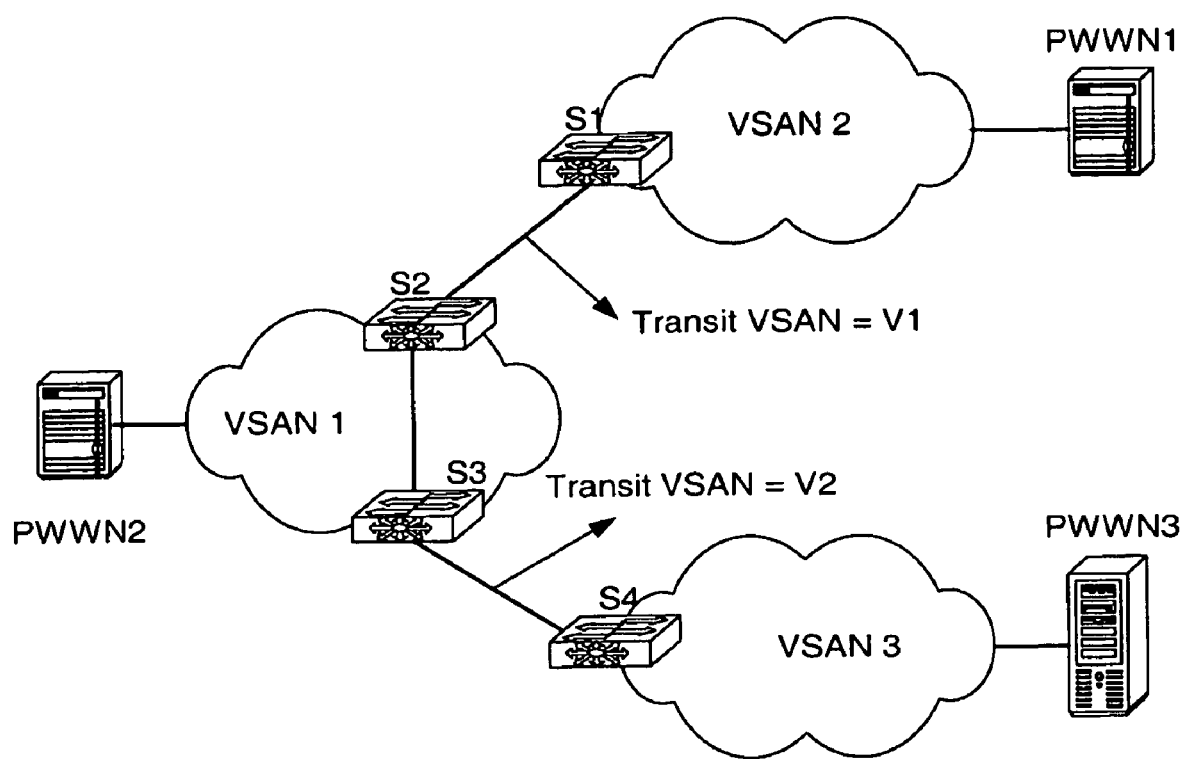
FIG. 7 is an exemplary VSAN for illustrating the operation of the present invention.

FIG. 7 presents a scenario where two devices, pWWN1 and pWWN2, need to communicate with a storage device pWWN3. The communication between pWWN2 and pWWN3 is similar to the other scenarios that have been discussed previously and therefore will not be discussed in detail herein. However, consider the case of pWWN1 communicating with pWWN3 where there is not a direct connection between the Border Switches of VSAN 2 and VSAN 3. FIG. 7 illustrates two subcases of this topology, when the two transit VSANs are the same and when they are not the same.

When the transits VSANs are the same, in order to have pWWN1 communicate with pWWN3, an Inter-VSAN zone is defined containing the two devices. There must be one or more links connecting switches S2 and S3 that carry the Transit VSAN traffic. If the link between the switches is not direct, all the switches in the path between S2 and S3 must carry the transit VSAN.

When the transit VSANs are not the same, the Inter-VSAN zones must be defined such that frames can be switched from one Transit VSAN to the other. In FIG. 7, a route to the switch associated with PWWN1 is announced in the transit VSAN by S1. S2 on hearing this route announcement as specified above, announces it in VSAN 1. In VSAN 1, when S3 hears this announcement, it propagates the route announcement to Transit VSAN V2, where S4 then announces in VSAN 3. Now a path has been established between the switches connected to end devices PWWN1 and PWWN3 and so communication can take place. Along with route announcements, name server query proxying and SW_RSCN propagation as specified above also occurs.

Figure 8:
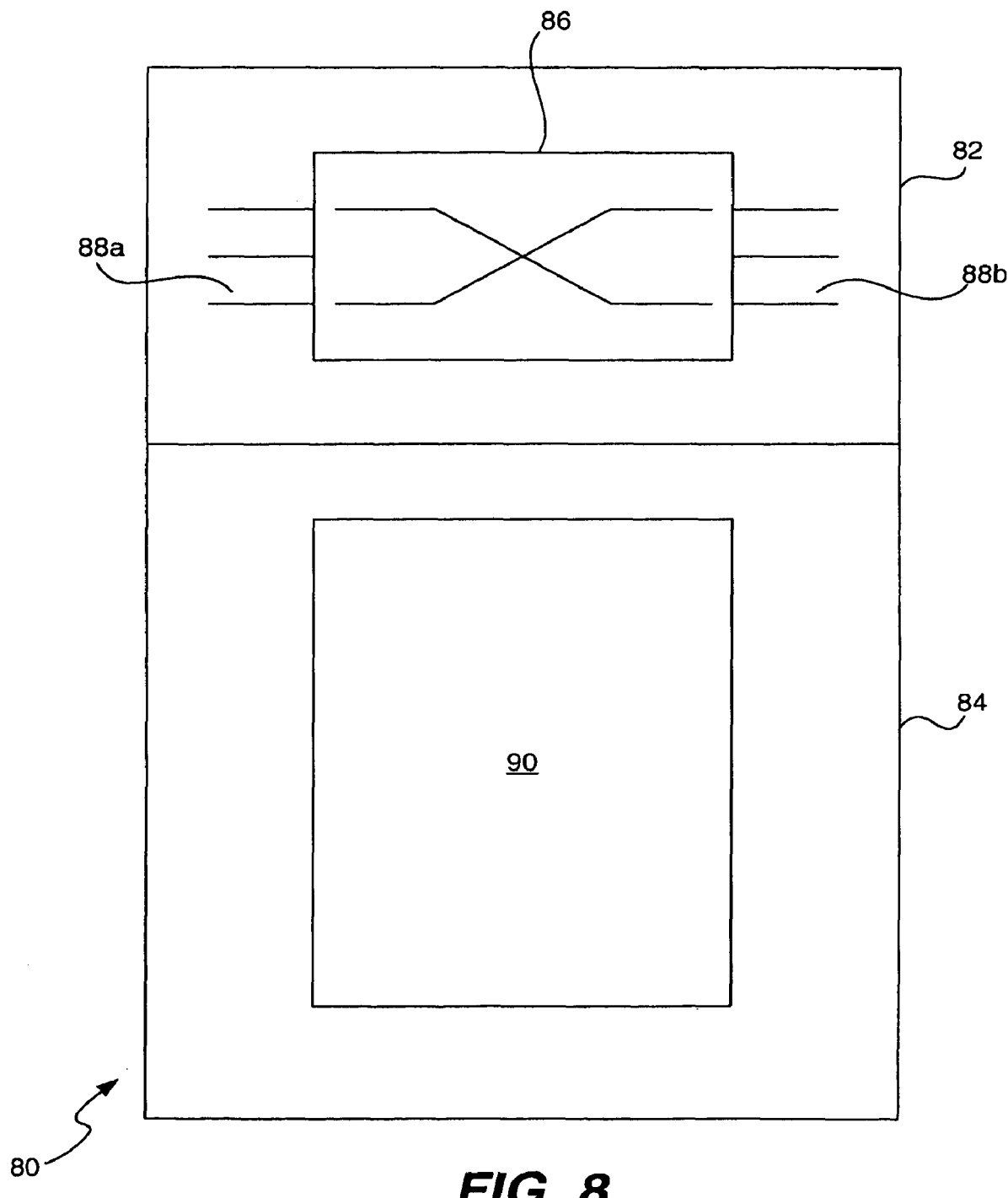
FIG. 8 is a block diagram of a Switch used to implement Inter-VSAN routing according to the present invention.

Referring to FIG. 8, a block diagram of a Switch that can be used for Inter-VSAN routing in a SAN according to the present invention is shown. The Switch 80 includes a data plane 82 and a control plane 84. In the data plane 82, the Switch includes switching logic 86 connected between two sets of ports 88a and 88b. The switching logic is configured to route or internally switch traffic received on one port 88a to another port 88b and vice versa. The control plane includes a state machine 90 for implementing the Port Manager; Domain Manager; Zone Server; Fabric Shortest Path First (FSPF); Name_Server; and Register State Change Notification (RSCN) protocols and their modification and changes as described herein. In alternative embodiments, the protocols can be implemented in hardware, programmable logic, in software running on a micro-controller, or a combination thereof.

The embodiments of the present invention described above are to be considered as illustrative and not restrictive. The various change commands described herein are only exemplary and any other types of commands may be used. The invention is not to be limited to the details given herein, but may be modified within the scope and equivalents of the appended claims.

What is claimed is:

1. A switch comprising:
   a first interface connected to a first plurality of devices including a first device in a first virtual storage area network (VSAN), the first plurality of devices having a first domain identifier (D_ID);
   a second interface connected to a second plurality of devices including a second device in a second VSAN, the second plurality of devices having a second D_ID;
   a processor configured to determine that the first device and the second device reside in a same inter-VSAN, wherein the first D_ID of the first device is exported to the second device upon determining that the first device and the second device reside in the same inter-VSAN.

2. The switch of claim 1, wherein the first D_ID of the first device is exported to the second device upon determining that the second device resides in a transit VSAN.

3. The switch of claim 1, wherein the switch is a border switch.

4. The switch of claim 3, wherein the border switch is configured to be part of both the first fabric and the second fabric.

5. The switch of claim 1, wherein the switch receives a plurality of Fabric Shortest Path First (FSPF) frames.

6. The switch of claim 5, wherein the switch forwards the plurality of FSPF frames to a plurality of devices that reside in the same inter-VSAN.

7. The switch of claim 5, wherein the switch forwards the plurality of FSPF frames to a plurality of devices that reside in a transit VSAN.

8. The switch of claim 1, wherein the switch determines the contents of a name server database exported from the first VSAN to the second VSAN.

9. The switch of claim 1, wherein the switch exchanges Inter-VSAN routing protocol (IVRP) messages with border switches in the first VSAN and the second VSAN.

10. A method comprising:
    receiving a first plurality of frames from a first plurality of devices including a first device in a first virtual storage area network (VSAN), the first plurality of devices having a first domain identifier (D_ID), the first plurality of frames received at a fibre channel switch;
    receiving a second plurality of frames from a second interface connected to a second plurality of devices including a second device in a second VSAN, the second plurality of devices having a second D_ID;
    determining that the first device and the second device reside in a same inter-VSAN, wherein the first D_ID of the first device is exported to the second device upon determining that the first device and the second device reside in the same inter-VSAN.

11. The method of claim 10, wherein the first D_ID of the first device is exported to the second device upon determining that the second device resides in a transit VSAN.

12. The method of claim 10, wherein the switch is a border switch.

13. The method of claim 12, wherein the border switch is configured to be part of both the first fabric and the second fabric.

14. The method of claim 10, wherein the switch receives a plurality of Fabric Shortest Path First (FSPF) frames.

15. The method of claim 14, wherein the switch forwards the plurality of FSPF frames to a plurality of devices that reside in the same inter-VSAN.

16. The method of claim 14, wherein the switch forwards the plurality of FSPF frames to a plurality of devices that reside in a transit VSAN.

17. The method of claim 10, wherein the switch determines the contents of a name server database exported from the first VSAN to the second VSAN.

18. The method of claim 10, wherein the switch exchanges Inter-VSAN routing protocol (IVRP) messages with border switches in the first VSAN and the second VSAN.

19. An apparatus comprising:

means for receiving a first plurality of frames from a first plurality of devices including a first device in a first virtual storage area network (VSAN), the first plurality of devices having a first domain identifier (D_ID), the first plurality of frames received at a fibre channel switch;

means for receiving a second plurality of frames from a second interface connected to a second plurality of devices including a second device in a second VSAN, the second plurality of devices having a second D_ID;

means for determining that the first device and the second device reside in a same inter-VSAN, wherein the first D_ID of the first device is exported to the second device upon determining that the first device and the second device reside in the same inter-VSAN.

20. The apparatus of claim 19, wherein the first D_ID of the first device is exported to the second device upon determining that the second device resides in a transit VSAN.

* * * * *